Patented Aug. 8, 1950

UNITED STATES PATENT OFFICE 2,517,824

RESINOUS PRODUCTS DERIVED FROM CONDENSATION PRODUCTS OF CYCLOALIPHATIC KETONES WITH GUANIDINES, DICYANDIAMIDE, OR BIGUANIDES

Andrew J. Appelquest, Old Greenwich, Conn., assignor to American Cyanamid Company, New York, N. Y., a corporation of Maine No Drawing. Application October 16, 1946,
Serial No. 703,468

3 Claims. (Cl. 260—64)

This invention relates to resinous aldehyde condensation products and more particularly, to aldehyde condensation products of the reaction products of amidines with reactive ketones.

It is an object of the present invention to prepare improved resins.

Another object of the present invention is to prepare water-insoluble resins suitable for use in surface coatings and molding compositions.

The above and other objects are attained by reacting an amidine such as biguanide, guanidine or dicyandiamide with a cycloaliphatic ketone such as cyclohexanone, followed by condensation of the resulting reaction product with an aldehyde such as formaldehyde.

The invention will be described in greater detail in conjunction with the following specific examples in which proportions are given in parts by weight. The examples are merely illustrative and it is not intended that the scope of the invention should be limited to the details therein set forth.

EXAMPLE 1

164 parts of the condensation product of dicyandiamide and cyclohexanone (1.0 mol)
162 parts of slightly acidic 37% Formalin (2.0 mols as formaldehyde)

The dicyandiamide condensation product and the Formalin are heated with stirring in a suitable vessel to about 140° C. during which heating water boils off and a hydrophobic resin forms. The resin is soluble in hydrochloric acid and when heated to 120°–140° C., it first melts and then cures.

EXAMPLE 2

Lacquers are prepared by heating a mixture of the condensation product of dicyandiamide and cyclohexanone, Formalin, and butanol to boiling, and distilling off water and butanol while adding dry butanol. Lacquers are prepared with a molar ratio of 3:1, formaldehyde to condensation product, and with a 4:1 ratio.

EXAMPLE 3

181 parts of the condensation product of biguanide and cyclohexanone (1.0 mol)
162 parts of 37% Formalin (2.0 mols as formaldehyde)

An exothermic reaction sets in immediately upon mixing of these two compounds. A tough mass which turns brittle on cooling is formed. The resin is white, insoluble in acid, alkali and water, and cured by the heat of reaction.

EXAMPLE 4

241 parts of the condensation product of biguanide acetate and cyclohexanone (1.0 mol)
162 parts of 37% Formalin (2.0 mols as formaldehyde)

The ingredients are heated together with stirring to about 140° C. during which heating water boils off. A clear, yellow resin is obtained which is soluble in acid, alkali and water.

EXAMPLE 5

576 parts of the condensation product of cyclohexanone and phenyl biguanide carbonate (1.0 mol)
162 parts of 37% Formalin (2.0 mols as formaldehyde)

The two substances are mixed together and a hydrophobic resin forms after a short time. The resin will not cure.

EXAMPLE 6

219 parts of the condensation product of guanidine and cyclohexanone (1.0 mol)
162 parts of 37% Formalin (2.0 mols as formaldehyde)

The two substances are mixed together and heated, with stirring, to about 140° C. During the heating period, water boils off and a resin which is insoluble in acid, alkali and water is obtained.

*Preparation of the condensation product of dicyandiamide and cyclohexanone*

336 parts of dicyandiamide (4.0 mols)
600 parts of cyclohexanone (6.0 mols)

The reactants are heated for 3 hours at 150°–160° C. in the course of which time 61 parts (3.4 mols) of water are formed. The reaction product is washed with acetone and recrystallized from methanol. The product has a melting point of 230° C. and the following analysis:

|  | Per cent C | Per cent H | Per cent N |
|---|---|---|---|
| Calculated for $C_8H_{12}N_4$ | 58.54 | 7.31 | 34.15 |
| Found | 57.56 | 7.16 | 35.53 |
|  | 57.83 | 7.33 | 35.71 |

Since only one mole of ketone reacts per mole of dicyandiamide, the product is probably a substituted quinazoline with the reaction proceeding as follows:

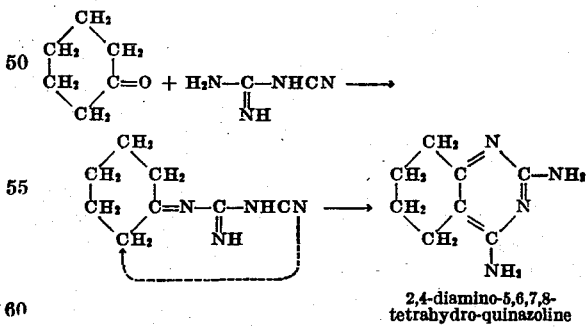

2,4-diamino-5,6,7,8-tetrahydro-quinazoline

I do not wish, however, to be limited to the above reaction mechanism since it is only theoretical.

Preparation of the condensation product of biguanide and cyclohexanone 36 parts of biguanide (0.36 mol)
150 parts of cyclohexanone (1.5 mols)

The materials are heated for ½ hour at 140° C. during which time 8 parts (0.4 mol) of water are formed. An exothermic reaction proceeds rapidly and the product, which is soluble in water and ethanol, solidifies. A 56% yield of a product melting at 238° C. and having the following analysis is obtained:

|  | Per cent C | Per cent H | Per cent N |
|---|---|---|---|
| Calculated for $C_8H_{15}N_5$ | 53.04 | 8.28 | 38.67 |
| Found | 52.71 | 7.70 | 39.84 |
|  | 52.62 | 7.56 | 40.00 |

Only one mole of ketone reacts per mole of biguanide and it appears that the reaction may be represented as follows:

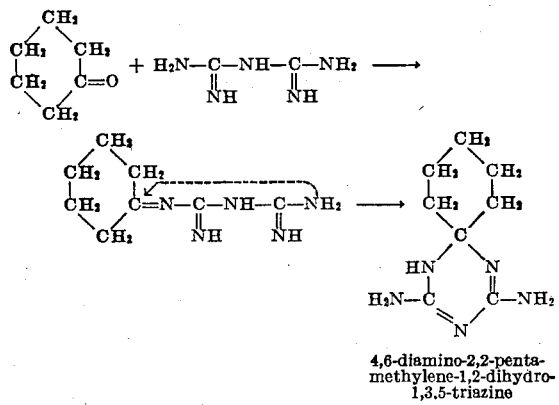

4,6-diamino-2,2-pentamethylene-1,2-dihydro-1,3,5-triazine

This is merely a theory of reaction mechanism, however, and I do not wish to be limited thereto.

Preparation of the condensation product of biguanide acetate and cyclohexanone 430 parts of biguanide acetate (2.7 mols)
500 parts of cyclohexanone (5.0 mols)

The substances are heated for 1½ hours at 150° C. during which time 58 parts (3.2 mols) of water are formed. A 50% yield of the acetate of the condensation product of cyclohexanone and free biguanide is obtained after the solid reaction product has been filtered and washed with benzene.

Preparation of the condensation product of phenyl biguanide carbonate and cyclohexanone 177 parts of phenyl biguanide (1.0 mol)
150 parts of cyclohexanone (1.5 mols)

The biguanide and the cyclohexanone are heated for ½ hour at 140° C. during which time 16 parts (0.9) of water are formed. No solid separates from the reaction mixture. The liquid product is diluted with acetone, 26 parts of water are added, and carbon dioxide is bubbled into the liquid to produce the carbonate. An 89% yield as carbonate of a material have the following analysis is obtained:

|  | Per cent C | Per cent H | Per cent N |
|---|---|---|---|
| Calculated for $C_{23}H_{40}N_{10}O_3$ | 60.41 | 6.94 | 24.20 |
| Found | 58.62 | 6.96 | 24.41 |
|  | 58.63 | 6.99 | 24.67 |

Preparation of the condensation product of guanidine and cyclohexanone 30 parts of guanidine (0.5 mol)
150 parts of cyclohexanone (1.5 mols)

The guanidine is added gradually over a period of about 5 minutes to the cyclohexanone, and the resulting mixture is heated for about ½ hour at 140° C. 14 parts (0.78 mols) of water are formed. If desired, 100 parts of benzene may be added to the reaction mixture in order to reflux off the water and to lower the temperature. An 87% yield of a compound having a melting point of 206° C. is obtained after the reaction product is washed with acetone and recrystallized from ethanol and butanol. The product has the following analysis:

|  | Per cent C | Per cent H | Per cent N |
|---|---|---|---|
| Calculated for $C_{13}H_{21}N_3$ | 71.2 | 9.6 | 19.2 |
| Found | 68.52 | 9.51 | 18.02 |
|  | 68.54 | 9.48 | 17.91 |

Since the guanidine-cyclohexanone reaction product and one prepared from guanidine and cyclohexylidene cyclohexanone are apparently identical, judging from the fact that a mixed melting point of the two shows no depression, the reaction apparently proceeds as follows:

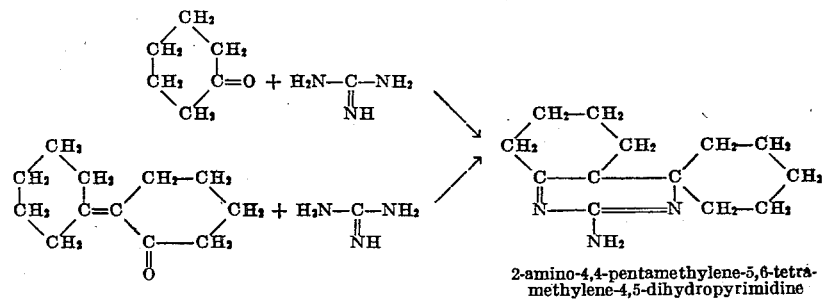

2-amino-4,4-pentamethylene-5,6-tetramethylene-4,5-dihydropyrimidine

I do not wish to be limited to this or any other particular theory of reaction mechanism, however.

Other amidines than those of the specific examples may be reacted with cycloaliphatic ketones to form resin intermediates useful in the process of the present invention. Among these are mono- and di-substituted biguanides and mono- and di-substituted guanidines for example, N,N'-diphenyl biguanide, N,N-diphenyl biguanide, octadecyl biguanide, N,N- and N,N'-dioctadecyl biguanides, monobenzyl biguanide, N,N-dibenzyl- and N,N'-dibenzyl biguanides, N-ethyl-N'-benzyl biguanide, monofurfuryl biguanide, N,N'-difurfuryl- and N,N-difurfuryl biguanides, monoethyl biguanide, N,N-diethyl, and N,N'-diethyl biguanides, butyl biguanide, isobutyl biguanide, tert. butyl biguanide and the corresponding N,N'- and N,N-dibutyl biguanides, octyl biguanide, N,N- and N,N'-dioctyl biguanides, etc., methyl guanidine, N,N- and N,N'-dimethyl guanidines, ethyl guanidine, N,N- and N,N'-diethyl guanidine, N'-methyl-N-ethyl guanidine, phenyl guanidine, N,N-diphenyl guanidine, N,N'-diphenyl guanidine, benzyl guanidine, N,N'- and N,N-dibenzyl guanidines, furfuryl guanidine, N,N'- and N,N-difurfuryl guanidines, butyl guanidine, isobutyl guanidine, tertiary butyl guanidine and the corresponding N,N'- and N,N-dibutyl guanidines, octyl guanidine, N,N-dioctyl- and N,N'-dioctyl guanidines, octadecyl guanidine, N,N-dioctadecyl and N,N'-dioctadecyl guanidines, etc. The corresponding salts such as the carbonates, acetates, etc., of the guanidines and biguanides, for example, guanidine carbonate, biguanide acetate, phenyl guanidine acetate, benzyl biguanide carbonate, etc., may also be used.

Monosubstituted dicyandiamides, for example, methyl dicyandiamide, ethyl dicyandiamide, the propyl dicyandiamides, the hexyl dicyandiamides, the octyl dicyandiamides, the octadecyl dicyandiamides, benzyl dicyandiamide, phenyl dicyandiamide, furfuryl dicyandiamide, etc., may be substituted for the dicyandiamide of the examples.

The present invention is generally applicable to condensation products of cycloaliphatic ketones. In addition to the cyclohexanone of the examples, cyclohexylidene cyclohexanone, cyclopentanone, kojic acid

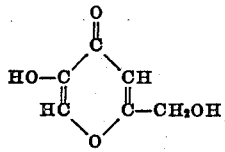

and other similar cycloaliphatic ketones, may be used to advantage.

Resin intermediates prepared by condensing amidines of the type listed above and specified in the examples with cycloaliphatic ketones such as, for example, the condensation product of butyl guanidine and cyclohexanone, N,N-diethyl guanidine and cyclohexanone, guanidine and cyclopetanone, biguanide and cyclopentanone, etc., may be resinified with aldehydes other than formaldehyde, polymers of formaldehyde or other formaldehyde-yielding substances. A few suitable aldehydes are benzaldehyde, acetaldehyde, crotonaldehyde, furfural, etc. These resin intermediates which are so resinified are monomeric condensation products of amidine and ketone, preferably in a molar ratio of 1:1 to 1:2. They are relatively simple organic compounds and not complex polymers.

The new resins of the present invention may be mixed with fillers, pigments, etc., to obtain molding compositions which can be shaped under heat and pressure. Various fillers including wood flour, wood filler, paper dust, clay, zein, glass, wool, mica, granite dust, silk flock, cotton flock, steel wool, silicon carbide, paper, cloth, sand, etc., may be used. Suitable pigments are carbon black, iron blue, chrome yellow, lithopone, etc. On the other hand, no filler or pigment need be incorporated if not desired.

My new resins are also useful in coating compositions. Any suitable plasticizers or solvent softeners may be incorporated into mixtures or blends of the resins of the present invention, and high-boiling solvent softeners are particularly useful in the production of lacquers and printing inks. Thus, for example, compounds of the ester type such as diethyl or dibutyl phthalate, dibutyl sebacate, ethyl or butyl lactate, etc., solvents of the ketone type such as ethyl or butyl benzoyl benzoate, etc., chlorhydrins such as epichlorhydrin, etc., and such substances as phthalide, sulfonamides, glycol ethers, etc., may be admixed with my resins. In addition are high-boiling alcohols such as cetyl alcohol, lauryl alcohol, n-octyl alcohol, capryl alcohol, cyclohexanol, methyl cyclohexanol, hydrofurfuryl alcohol, butanol, pentanol, mixtures of isomeric pentanols, etc. Solvents or softeners of other types may also be used, for example, solvent mineral oils, pine oil, toluol, xylol, castor oil, other non-drying or semi-drying oils and in general any of the solvents, plasticizers or thinners now employed in the paint, lacquer, varnish and printing ink industries.

Obviously, natural resins or other synthetic resins may be admixed with the resins of the present invention in order to obtain products suitable for particular purposes. Examples of a few of these are shellac, cellulose esters and ethers, urea resins, melamine resins, phenolic resins, alkyd resins, copolymers of unsaturated alkyd resins and unsaturated monomeric compounds, ester gum, etc. The resins may also be mixed with rubber or synthetic rubber if desired.

I claim:

1. A formaldehyde condensation product according to claim 2 in which the cycloaliphatic ketone is cyclohexanone.

2. A formaldehyde condensation product of the organic heat condensation product of dicyandiamide with a cycloaliphatic ketone selected from the group consisting of cyclohexanone, cyclohexylidene cyclohexanone, and cyclopentanone in a molar ratio of 1:1 to 1:2, dicyandiamide to ketone.

3. A lacquer which is a solution in an organic solvent of a formaldehyde condensation product according to claim 2.

ANDREN J. APPELQUEST.

REFERENCES CITED

The following references are of record in the file of this patent:

UNITED STATES PATENTS

| Number | Name | Date |
| --- | --- | --- |
| 1,906,942 | ter Horst | May 2, 1933 |
| 1,952,060 | Ellis | Mar. 27, 1934 |
| 1,986,067 | Paquin | Jan. 1, 1935 |
| 2,323,898 | D'Alelio | July 13, 1943 |
| 2,325,376 | D'Alelio | July 27, 1943 |

Certificate of Correction

Patent No. 2,517,824                                                              August 8, 1950

ANDREN J. APPELQUEST

It is hereby certified that error appears in the printed specification of the above numbered patent requiring correction as follows:

Columns 3 and 4, right hand portion of last formula, for

column 5, line 46, for the syllable "petanone" read *pentanone*;

and that the said Letters Patent should be read as corrected above, so that the same may conform to the record of the case in the Patent Office.

Signed and sealed this 7th day of November, A. D. 1950.

[SEAL]

THOMAS F. MURPHY,
                                                                      *Assistant Commissioner of Patents.*